United States Patent [19]

Flax

[11] 3,934,780
[45] Jan. 27, 1976

[54] APPARATUS FOR MAKING TUBULAR CONTAINERS

[75] Inventor: Valere Flax, Fezensac, France

[73] Assignee: Metal Box Limited, Reading, England

[22] Filed: Aug. 26, 1974

[21] Appl. No.: 500,555

Related U.S. Application Data

[62] Division of Ser. No. 383,597, July 30, 1973, abandoned.

[30] Foreign Application Priority Data

Aug. 3, 1972   France .............................. 72.28664

[52] U.S. Cl.................................... 228/2; 228/112
[51] Int. Cl.².......................................... B23K 19/02
[58] Field of Search ........ 228/2; 29/470.3; 156/73.5

[56] References Cited
UNITED STATES PATENTS

| | | | |
|---|---|---|---|
| 3,446,688 | 5/1969 | Flax ............................... | 156/73.5 X |
| 3,824,145 | 7/1974 | Flax ................................ | 228/2 X |

Primary Examiner—James L. Jones, Jr.
Assistant Examiner—Margaret Joyce
Attorney, Agent, or Firm—W. G. Fasse; W. W. Roberts

[57] ABSTRACT

The present tubular containers, for example for foodstuffs, toothpaste, or the like, have a top cap secured to an initially open ended tubular body by means of a heat bond such as soldering where metal containers are involved or welding or fusing where plastics materials are involved. The heat for making the bond is generated by friction resulting from relative rotation between the cap and the tubular body. For this purpose, a tool is provided with a rotatably supported counter presser forming an inner holding member and with a rotating presser tool forming an outer holding member which holding members hold the cap therebetween so that its outer rim contacts the edge of the tubular body to produce frictional heat when the cap and tubular body are rotated relative to each other, said frictional heat being sufficient to cause said bond.

10 Claims, 5 Drawing Figures

APPARATUS FOR MAKING TUBULAR CONTAINERS

BACKGROUND OF THE INVENTION

This is a division of application Ser. No. 383,597, filed July 30, 1973, now abandoned.

The present invention relates to tubular containers and a method and apparatus for manufacturing such containers which are used, for example, for toothpaste, foodstuffs, and the like.

It is known to manufacture containers of the above type from tubular bodies and separate caps. Various methods are known for joining the cap and the tubular body to each other, for example, it is known to weld or solder a cap to a cylindrical tubular body by the application of externally generated heat. It is also known to bond the cap to the tubular body by so called friction soldering wherein friction heat is produced by the friction between the exterior or outer surface of the cap and a stationary pressing tool. This type of arrangement has the disadvantage that particles are rubbed off the outer surface of the cap thereby creating a dust which soils the tubular containers. Thus, it has been necessary heretofore to clean these prior art tubular containers, for example, by an air blast which involves an extra manufacturing step which not only increases the cost of the containers but is also imperfect in its cleaning results. Prior to this invention it has been unavoidable to prevent said dust formation because the cap was rotated by a shaft extending axially through the tubular body and pressed against a stationary external counter pressing tool whereby the outer surface of the cap was rubbing against the stationary counter presser tool. Such rubbing unavoidably resulted in the production of loose dust particles.

OBJECTS OF THE INVENTION

In view of the foregoing, it is the aim of the invention to achieve the following objects, singly or in combination:

to avoid any friction between the cap and stationary tool members in order to avoid said dust formation;
to generate the necessary soldering or fusion heat by producing the friction directly between the inner surface of the tubular body and the circumferential surface of said cap whereby the generated frictional heat is confined precisely to the soldering or fusing zones;
to provide an apparatus which will securely hold the cap in actual alignment relative to the tubular member, so that the circumferential surface of the cap will be in frictional pressure contact with the free end surface of the tubular body; and
to provide a method and apparatus for the joining of a cap to tubular body whereby any frictional rubbing contact between either the cap or the tubular body on the one hand and a stationary tool member on the other hand is avoided.

SUMMARY OF THE INVENTION

According to the invention there is provided a tubular container, for example, for toothpaste, foodstuffs, or the like which comprises a heat joint between a tubular body and a cap whereby the heat is generated by friction between the cap and the tubular body. According to the invention there is further provided a method for bonding a cap to an open ended tubular body along a joining seam adjacent one end of said tubular body by applying heat to said seam wherein the cap and tubular body are brought into frictional contact with each other along said seam and rotating said cap and tubular body relative to each other whereby sufficient frictional heat is generated for accomplishing said bond.

According to the invention there is further provided an apparatus for bonding a cap to one end of an open ended tubular body along a joining seam comprising first holding means for said tubular body and second holding means for said cap for holding said cap and tubular body in actual alignment with each other relative to a rotational axis, said apparatus further comprising means for moving said first and second holding means axially relative to each other and pressure means for pressing said holding means axially relative to each other to bring the cap into frictional contact with the tubular body along said seam, as well as drive means operatively connected to at least one of said holding means for positively rotating one of said holding means relative to the other to produce sufficient bonding heat by friction between the cap and the tubular body while avoiding frictional rubbing between a tool member and the cap or tubular body.

The containers according to the invention may be made from materials conventionally employed for this purpose, for example, tin foil or plastics material such as polyvinyl chloride.

BRIEF FIGURE DESCRIPTION

In order that the invention may be clearly understood, it will now be described by way of example with reference to the accompanying drawings, wherein:

FIGS. 1, 2, and 3 illustrate different modifications of tubular containers according to the invention;

FIG. 4 illustrates a sectional view through an apparatus according to the invention for producing tubular containers; and FIG. 5 illustrates a sectional view similar to that of FIG. 4, however, showing a modified embodiment of the apparatus according to the invention.

DETAILED DESCRIPTION OF EXAMPLE EMBODIMENTS:

Figure 1:
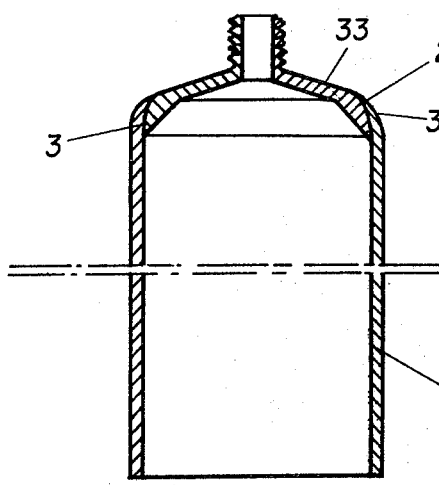
Figure 2:
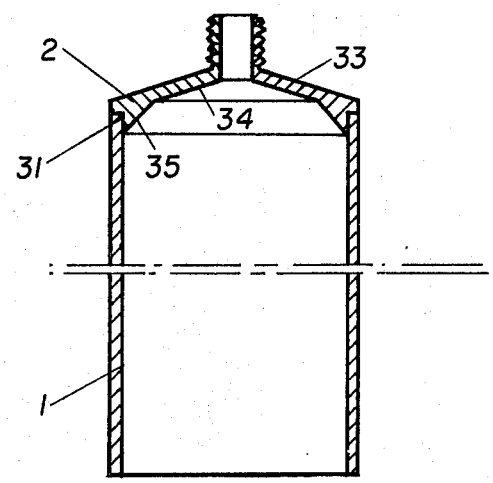
Figure 3:
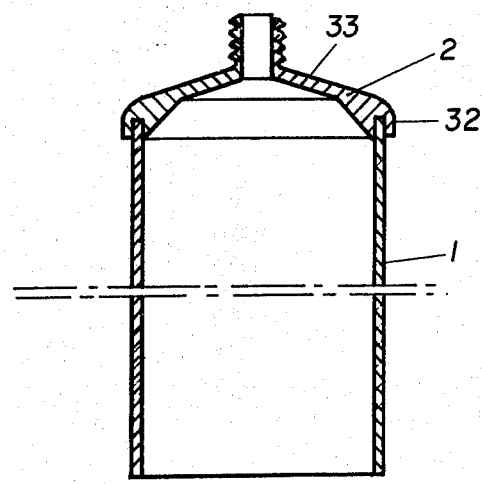

Referring first to FIGS. 1, 2, and 3, these figures illustrate longitudinal, sectional views through three different embodiments of tubular containers according to the invention. In FIG. 1, a tubular body 1 is secured by frictional soldering to a cap 2 whereby the heat generating friction is confined to the outer circumferential surface 3 and a respectively inwardly facing surface of the tubular body 1. Preferably, the free end 3' of the tubular body 1 is flanged radially inwardly to securely grip the outer circumferential surface 3 of the cap 2.

The construction of FIG. 2 is similar, however, the circumferential surface of the cap 2 is provided with an outwardly facing shoulder 31 which receives the free end of the tubular body 1.

FIG. 3 illustrates a cap 2 provided with a groove 32 adjacent to its circumferential surface, and groove receiving the free edge of the tubular body 1.

With reference to FIGS. 1, 2, and 3 it will be observed that the cap 2 has the shape of a hollow cone whereby the outer surface 33 has preferably but one slope whereas the inner surface of the hollow cone is provided according to the invention with two separate slopes 34 and 35. Due to these separate inner slopes, of which the slope 35 is more acute relative to the longitudinal rotational axis of the container than the slop 34, the circumferential portion of the cap 2 is reinforced by a ring shaped bulge which has a cross-sectional area of substantially triangular shape.

Figure 4:
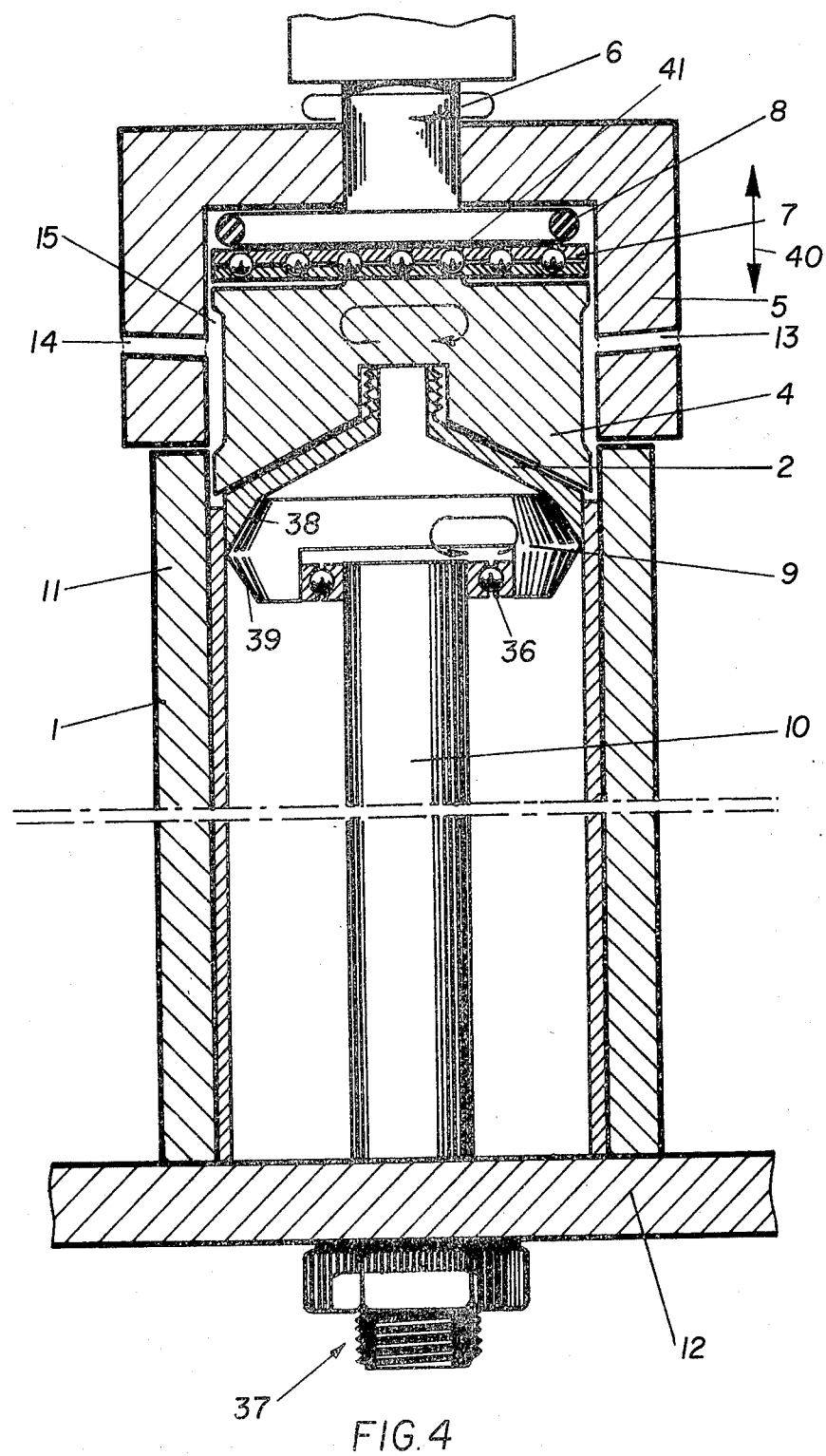

FIG. 4 illustrates a sectional view through one embodiment of the apparatus according to the invention for producing tubular containers. A first holding means, such as a cylindrical housing 10, is secured to a base 12 in a stationary, conventional manner. The housing 11 receives the tubular body 1 as shown in FIG. 4. Second holding means are provided for the cap 2. These second holding means comprise an upper holding member 4 and a lower holding member 9. The lower holding member 9 acts as a counter presser means and is rotatably secured to the top of a supporting mandrel 10, for example, by bearing 36. The lower end of the mandrel 10 is secured to the base 12, for example, by a thread and nut 37.

The counter presser holding member 9 is provided with a sloping circumferential surface 38 facing the inwardly facing surface of the cap 2. The slop of the surface 38 is such, that the diameter of the counter presser holding member 9 increases as the distance from an upper or outer holding member 4 increases axially until the diameter of the counter presser holding member 9 corresponds to about the inner diameter of the tubular body 9 to permit the free rotation of the member 9 relative to the inner surface of the tubular body 1. Preferably, the counter presser holding member 9 is provided with a further sloping circumferential surface 39 which slopes away from the inner surface of the tubular body 1 in order to minimize contact, if any, between the member 9 and the inner surface of the tubular body 1.

Due to the sloping surface 38 of the counter presser holding member 9, a radially outwardly extending force component will be created when the outer pressure member 4 is pressed axially toward the member 9. This radially outwardly effective force presses the outer circumferential surface of the cap 2 against the inner circumferential surface of the tubular body 1 in the region of a seam where the soldering is to take place by the heat generated due to the friction between said just mentioned surfaces. Said radially outwardly effective force components may, if desired, somewhat increase the normal diameter of the cap 2.

The outer holding member 4, of the holding means for the cap 2 comprises a cap facing surface conforming to the outer surface of the cap. Further, the member 4 is rotatably supported in a housing 5, for example, by means of a shaft 6 extending through respective bearing means, for example sleeve bearing means not shown in detail, in the housing 5, whereby an axial movement along the arrow 40 is possible. The shaft 6 is connected to drive means, for example a motor for rotating the holding and pressure exerting member 4. Since the member 4 is firmly pressed against the cap whereby the latter in turn is firmly pressed against the counter pressure holding member 9, the members 4 and 9 will rotate in the same direction and no relative frictional rubbing will result whereby any dust production is avoided.

The axial pressure may be exerted by any resilient means operatively connected between the stationary housing 5 and the member 4. For example, resilient or elastomeric means may be located between the housing 5 and the member 4. In the example embodiment, an elastomeric ring 8 is located between the bottom of the housing 5 and an intermediate plate or ring 41 which rests on a bearing 7 which in turn bears against the member 4. The resiliency of the elastomeric ring 8 is sufficient to normally bias the member 4 downwardly against the cap 2 and thus against the counter presser member 9.

The housing 5 is provided with an inlet port 13 and an outlet port 14 for introducing into the housing 4 a lubricating fluid under pressure, for example, pressurized air whereby any friction between the inner surfaces of the housing walls and the member 4 is minimized. For this purpose, the member 4 is provided with a channel 15 for circumferentially distributing the, preferably pressurized, lubricating fluid.

It will be appreciated, that the counter pressure member 9 could be actively driven rather than the pressure member 4. In any event, the drive means for the holding and pressure members are conventional and hence not shown in detail.

Figure 5:
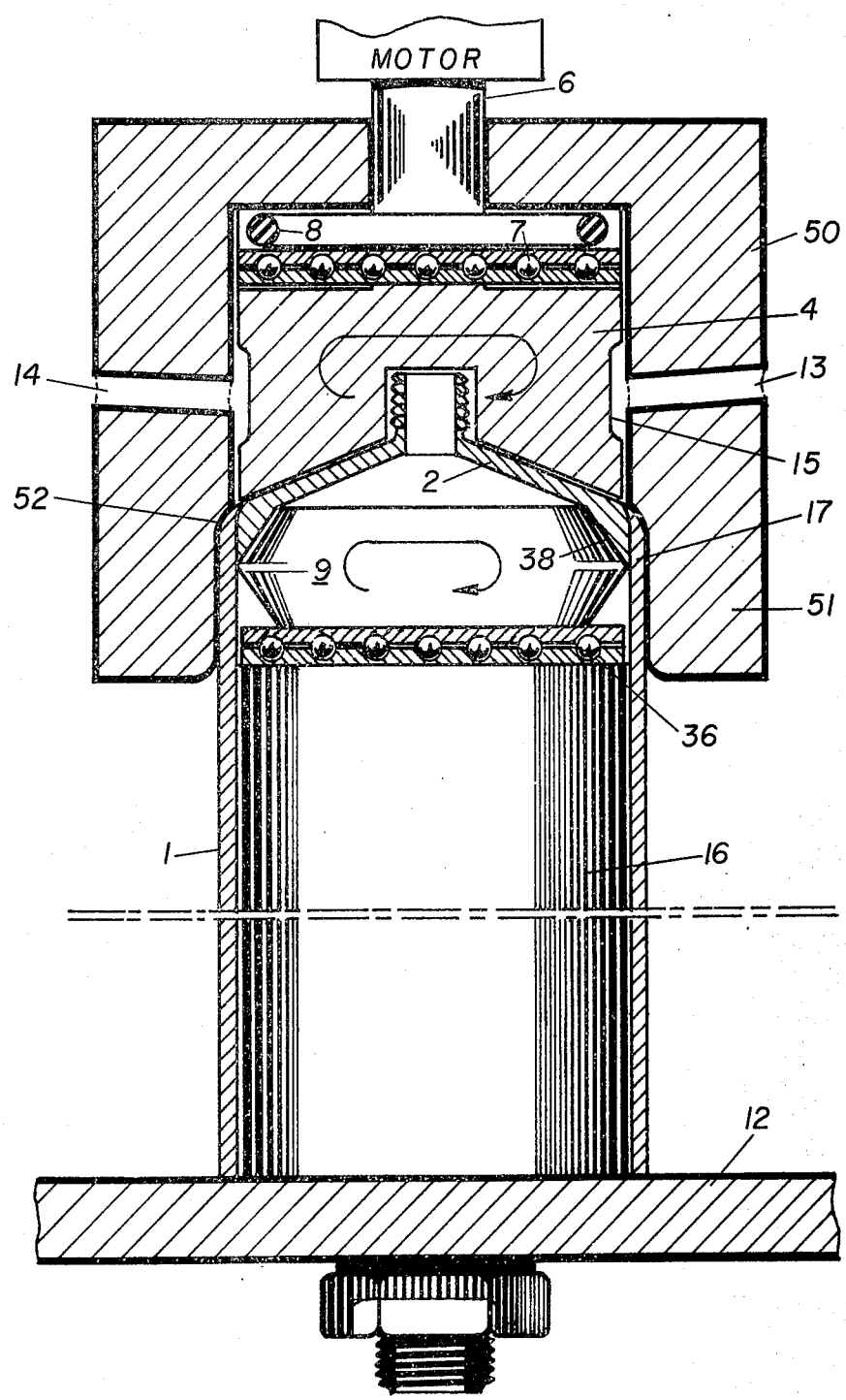

Referring to FIG. 5 there is shown a modified embodiment of the apparatus according to the invention. In this embodiment, the tubular body 1 is held in position on a fixed mandrel 16 secured to the base 12 as described above. The outer diameter of the mandrel 16 is sufficient to properly fit into the tubular body 1. The length of the mandrel 16 is such that the sloping surface 38 of the counter presser member 9 faces the inner surface of the upper end 17 of the tubular body 1.

The elements for exerting the pressure and holding the cap 2 are substantially the same as described above with reference to FIG. 4. However, the housing 50 is provided with a downwardly reaching skirt 51 having a length preferably such that it will overlap with the mandrel 16, as shown in FIG. 5. Further, the inner surface of the housing 50 is provided with a shoulder 52 which not only holds the upper edge of the tubular body 1 in position but also flanges it against the circumferential surface of the cap 2.

Here again, the pressure exerting holding member 4 or the counter pressure holding member 9 may be actively driven. As illustrated, a motor drives the member 4 through its shaft 6.

Although the invention has been described with reference to specific example embodiments, it will be appreciated, that it is intended to cover all modifications and equivalents of the invention within the scope of the appended claims.

I claim:

1. An apparatus for bonding a cap to one end of an open ended tubular body along a joining seam adjacent one end of said tubular body by applying heat to said seam, comprising first means for holding said tubular body, said first holding means having a longitudinal axis, second means for holding said cap in axial alignment with said first holding means relative to said longitudinal axis, means for axially moving said first and second holding means axially relative to each other, pressure means for pressing said holding means axially relative to each other to bring the cap into frictional contact with said tubular body along said seam, drive means operatively connected to at least one of said holding means for positively rotating one of said holding means relative to the other to produce sufficient bonding heat by friction between the cap and the tubular body, wherein said second holding means comprise an outer holding member and an inner holding member, a housing, means for rotatably and axially movably supporting said outer holding member in said housing, and means for rotatably supporting said inner holding member inside said tubular body in axial alignment with said outer holding member to receive said cap between the inner and outer holding members, and wherein said pressure means are located between said outer holding member and said housing for pressing the outer holding member and thus the cap against the inner holding member.

2. The apparatus according to claim 1, wherein said first holding means comprise a stationary, cylindrical housing for receiving said tubular body therein.

3. The apparatus according to claim 1, wherein said first holding means comprise a stationary, cylindrical mandrel for receiving said tubular body thereon.

4. The apparatus according to claim 1, wherein said inner holding member has a circumferential surface facing said cap which circumferential surface is inclined relative to said rotational axis such that the diameter of the inner holding member increases as the axial spacing from said outer holding member increases, whereby the diameter of the cap is increased.

5. The apparatus according to claim 1, wherein said outer holding member has a cap facing surface which conforms to the outer surface of the cap.

6. The apparatus according to claim 1, wherein said means for axially and movably supporting said holding means comprise a shaft axially secured to said outer holding member and axial movement permitting means in said housing for receiving said shaft.

7. The apparatus according to claim 1, wherein said drive means are operatively connected to said outer holding member, said apparatus comprising inlet and outlet port means in said housing for admitting a fluid under pressure to lubricate said outer holding member as it rotates in said housing.

8. The apparatus according to claim 1, wherein said pressure means comprise an elastomeric ring located to bias said inner and outer holding members toward each other.

9. The apparatus according to claim 8, wherein said means for rotatably supporting said outer holding member comprise bearing means located between said elastomeric ring and said outer holding member whereby said elastomeric ring remains stationary relative to said housing.

10. The apparatus according to claim 1, wherein said housing for said outer holding member comprises a skirt and an inner shoulder separating said skirt from said housing proper, said skirt receiving at least a portion of said tubular body whereby a free edge of said tubular body rests against said shoulder.

* * * * *